(12) United States Patent
Roth

(10) Patent No.: US 10,710,697 B2
(45) Date of Patent: Jul. 14, 2020

(54) AIRCRAFT INTERIOR LINING COMPONENT, METHOD FOR PRODUCING AN AIRCRAFT INTERIOR LINING COMPONENT, AND AIRCRAFT ASSEMBLY

(71) Applicant: Airbus Operations GmbH, Hamburg (DE)

(72) Inventor: Ingo Roth, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 533 days.

(21) Appl. No.: 15/420,963

(22) Filed: Jan. 31, 2017

(65) Prior Publication Data

US 2017/0137105 A1 May 18, 2017

Related U.S. Application Data

(63) Continuation of application No. PCT/EP2015/067803, filed on Aug. 3, 2015.

(30) Foreign Application Priority Data

Aug. 7, 2014 (DE) .......................... 10 2014 215 661

(51) Int. Cl.
*B64C 1/06* (2006.01)
*B64C 1/40* (2006.01)

(52) U.S. Cl.
CPC ................ *B64C 1/066* (2013.01); *B64C 1/40* (2013.01); *B64C 1/403* (2013.01); *Y02T 50/46* (2013.01)

(58) Field of Classification Search
CPC ..................................................... B64C 1/066
See application file for complete search history.

(56) References Cited

U.S. PATENT DOCUMENTS 5,712,017 A * 1/1998 Jordan ...................... B32B 5/28
428/113
2005/0230544 A1* 10/2005 Busch ...................... B64C 1/066
244/118.5

(Continued)

FOREIGN PATENT DOCUMENTS

CN 102555329 A 7/2012
CN 103419379 A 12/2013

(Continued)

OTHER PUBLICATIONS

German Patent Office, German Search Report for German Patent Application No. 10 2014 215 661.0 dated Mar. 2, 2015.

(Continued)

*Primary Examiner* — Philip J Bonzell
*Assistant Examiner* — Michael B. Kreiner
(74) *Attorney, Agent, or Firm* — Jenkins, Wilson, Taylor & Hunt, P.A.

(57) ABSTRACT

An aircraft interior lining component is formed at least partially of a thermoplastic foam material and includes a first surface which faces an interior of an aircraft cabin when the aircraft interior lining component is mounted in an aircraft, and a second surface which faces away from the interior of the aircraft cabin when the aircraft interior lining component is mounted in an aircraft. The second surface of the aircraft interior lining component includes at least one supporting section and at least one surface section adjacent to the supporting section and recessed relative to the supporting section. The supporting section is dimensioned and arranged so that it is supported, when the aircraft interior lining component is mounted in an aircraft, on an element of a primary structure of the aircraft at least when a predetermined load acts on the first surface of the aircraft interior lining component.

11 Claims, 4 Drawing Sheets

(56) References Cited

U.S. PATENT DOCUMENTS

| | | | |
|---|---|---|---|
| 2008/0073465 A1* | 3/2008 | Veihelmann | B29C 65/5057 244/133 |
| 2008/0081400 A1 | 4/2008 | Doi et al. | |
| 2011/0133027 A1* | 6/2011 | Graeber | B64C 1/066 244/118.5 |
| 2012/0074258 A1 | 3/2012 | Papke et al. | |
| 2012/0148824 A1* | 6/2012 | Martin | B29C 70/342 428/301.4 |
| 2013/0125354 A1 | 5/2013 | Benthien et al. | |
| 2015/0190973 A1* | 7/2015 | Martin | B28B 19/00 156/60 |

FOREIGN PATENT DOCUMENTS

| | | |
|---|---|---|
| CN | 103502094 A | 1/2014 |
| CN | 106536348 B | 6/2019 |
| DE | 102006041787 A1 | 3/2008 |
| DE | 102007026296 A1 | 12/2008 |
| DE | 102007041282 B4 | 5/2009 |
| DE | 102011001267 A1 | 9/2012 |
| EP | 2463083 A2 | 6/2012 |
| EP | 2591909 A2 | 5/2013 |
| EP | 2664446 A1 | 11/2013 |
| EP | 2669184 A2 | 12/2013 |
| EP | 2730495 A1 | 5/2014 |
| EP | 3 177 523 B1 | 1/2019 |
| WO | 2008101986 A1 | 8/2008 |
| WO | 2008148537 A1 | 12/2008 |
| WO | 2012152934 A2 | 11/2012 |

OTHER PUBLICATIONS

International Searching Authority, International Search Report for International Application No. PCT/EP2015/067803 dated Sep. 14, 2015.

The People's Republic of China, First Office Action for Chinese Patent Application No. 201580039565.3 dated Jun. 1, 2018.

European Office Action for Application No. 15744939.8 dated Feb. 7, 2018.

\* cited by examiner

AIRCRAFT INTERIOR LINING COMPONENT, METHOD FOR PRODUCING AN AIRCRAFT INTERIOR LINING COMPONENT, AND AIRCRAFT ASSEMBLY

CROSS-REFERENCE TO RELATED APPLICATION(S)

This is a continuation of International Application No. PCT/EP2015/067803, filed Aug. 3, 2015, which application claims priority to German Application No. 10 2014 215 661.0, filed Aug. 7, 2014, which are hereby incorporated by reference in their entirety.

TECHNICAL FIELD

The disclosure relates to an aircraft interior lining component, a method for producing an aircraft interior lining component, and an aircraft assembly comprising an aircraft interior lining component.

BACKGROUND

Aircraft interior lining components serve for the visual design of the aircraft cabin. Furthermore, they form a cabin-side boundary of a space present between the interior lining components and the aircraft structure, which space serves as an installation space for a large number of components, such as, e.g., electrical lines, air- or water-conducting lines or other components of the aircraft. Interior lining components which are currently installed in modern aircraft are generally formed as sandwich components, described, for example, in DE 10 2006 041 787 A1, US 2008/073465 A1, DE 10 2007 041 282 B4, US 2008/081400 A1, DE 10 2007 026 296 A1, or WO 2008/148537 A1, which have a core and decorative layers applied to the core.

BRIEF SUMMARY

The subject matter presented here is directed to specifying an aircraft interior lining component which has a reduced weight compared with conventional sandwich panels. Furthermore, the subject matter is directed to specifying a method for producing such an aircraft interior lining component, and an aircraft assembly comprising an aircraft interior lining component.

Certain advantages are achieved by an aircraft interior lining component having the features recited in the claims, a method for producing an aircraft interior lining component having the features recited in the claims, and an aircraft assembly having the features recited in the claims.

An aircraft interior lining component according to an embodiment of the invention is composed at least partially of a thermoplastic foam material. The aircraft interior lining component comprises a first surface which faces an interior of an aircraft cabin when the aircraft interior lining component is mounted in an aircraft. Furthermore, the aircraft interior lining component has a second surface which faces away from the interior of the aircraft cabin when the aircraft interior lining component is mounted in an aircraft, i.e., faces a primary structure and an outer skin of the aircraft. The second surface of the aircraft interior lining component comprises at least one supporting section and at least one surface section adjacent to the supporting section and recessed relative to the supporting section. The surface section may, for example, have a concavely recessed shape, but any other configurations of the surface section are also conceivable. The supporting section is dimensioned and arranged so that it is supported, when the aircraft interior lining component is mounted in an aircraft, on an element of the primary structure of the aircraft at least when a predetermined load acts on the first surface of the aircraft interior lining component.

In contrast to conventional sandwich components, the aircraft interior lining component is thus designed so that, at least if required (i.e., when loaded) it is supported on an element of the primary structure of the aircraft. The requirements to be met by the aircraft interior lining component regarding its bearing properties can therefore be considerably lower than with conventional sandwich components. Consequently, the aircraft interior lining component can advantageously be produced at least predominantly from a thermoplastic foam material. The aircraft interior lining component can therefore be produced relatively simply and cost-effectively and is moreover distinguished by a reduced weight compared with conventional sandwich components. The weight advantage of the aircraft interior lining component over conventional sandwich components is further increased by forming the second surface of the interior lining component with a surface section recessed relative to the supporting section, since the aircraft interior lining component has, in the region of the recessed surface section, a smaller thickness than in the region of the supporting section.

Furthermore, the aircraft interior lining component composed at least partially of a thermoplastic foam material has the advantage over a conventional sandwich component that fewer different materials are required for the production of the aircraft interior lining component and the aircraft interior lining component can therefore be recycled more simply and cost-effectively. Moreover, the thermoplastic foam material of the aircraft interior lining component is distinguished by good acoustic properties, i.e., good sound-deadening properties, and also good thermal insulation properties. This makes it possible optionally to reduce the volume and thus the weight of a primary insulation which is typically provided between the aircraft interior lining and the aircraft primary structure.

The element of the primary structure of the aircraft which serves to support the aircraft interior lining component, at least when loaded, may, for example, be a stringer of the aircraft primary structure which extends parallel to a longitudinal axis of the aircraft. Depending on the dimensioning of the aircraft interior lining component, the second surface of the aircraft interior lining component may also be provided with a plurality of supporting sections which then are respectively dimensioned and arranged so that, in a state of the aircraft interior lining component when mounted in an aircraft, they are supported on an element, preferably a stringer, of the primary structure of the aircraft, at least when loaded. Likewise, the second surface of the aircraft interior lining component may also have a plurality of surface sections.

The supporting section provided in the region of the second surface of the aircraft interior lining component may bear directly against the element, assigned to it, of the primary structure of the aircraft when the aircraft interior lining component is mounted in an aircraft. Alternatively thereto, a distance between the supporting section of the aircraft interior lining component and the element of the aircraft primary structure may, however, also be provided at least when no load acts on the first surface of the aircraft interior lining component. This distance may, for example, be approximately 5 mm. There can then be arranged between the supporting section of the aircraft interior lining component and the element of the aircraft primary structure, for example, a section of a primary insulation element usually compressible without damage.

The distance provided between the supporting section of the aircraft interior lining component and the element of the aircraft primary structure must, however, be chosen, while taking into account the deformation properties of the aircraft interior lining component, so that it is ensured that the aircraft interior lining component is supported, as desired, on the element of the aircraft primary structure when a predetermined load acts on the first surface of the aircraft interior lining component and thereby the aircraft interior lining component and consequently the supporting section is pushed in the direction of the element of the aircraft primary structure. A predetermined load which has to act on the first surface of the aircraft interior lining component, in order that the supporting section of the aircraft interior lining component is supported in a load-transmitting manner on an element of the aircraft primary structure, can be defined, for example, as a hand load which a person applies to the first surface of the aircraft interior lining component when leaning against the first surface of the aircraft interior lining component.

With regard to its basic shape, the aircraft interior lining component may be of similar form to conventional sandwich components. The aircraft interior lining component can then be mounted using existing fastening points on the aircraft structure. There is then no need for a complex reconfiguration of the fastening points, with the result that the aircraft interior lining component can also be installed as a replacement component in existing aircraft.

The aircraft interior lining component may be provided with an inner hollow space in the region of the supporting section. As a result, the weight of the aircraft interior lining component can be further reduced, without unduly impairing the mechanical properties of the component. If desired or required, an inner surface of the hollow space may be provided with reinforcing structures, such as, e.g., reinforcing ribs or the like.

Preferably, the aircraft interior lining component is provided with a perforation-proof reinforcing layer in the region of its first surface, i.e., in the region of its surface which faces the interior of the aircraft cabin when the aircraft interior lining component is mounted in an aircraft. As a result, undesired damage to the aircraft interior lining component can be avoided. The reinforcing layer may be composed, for example, of a fibre-reinforced plastics material, in particular a carbon-fibre-reinforced plastics material. In particular, the aircraft interior lining component may be provided, in the region of its first surface, with a reinforcing layer made of a carbon-fibre-reinforced recycled plastics material. The perforation-proof reinforcing layer may be formed so that it also acts as a decorative layer for the first surface of the aircraft interior lining component. Alternatively thereto, an additional decorative layer may, however, also be applied to the reinforcing layer.

In a preferred embodiment of the aircraft interior lining component, a window opening is formed in the aircraft interior lining component. The aircraft interior lining component can then be used in an aircraft cabin as a side lining panel. If desired, a receiving channel for receiving a blind may also be formed in the aircraft interior lining component. The receiving channel may, for example, be of slot-shaped form and have a length which enables the blind to be completely received when the blind is open and uncovers the window opening formed in the aircraft interior lining component.

In the region of its second surface, the aircraft interior lining component may be provided with an acoustic backing. The acoustic backing may comprise, for example, a sound-absorbing nonwoven fabric and further improve the sound-deadening properties of the aircraft interior lining component. Additionally or alternatively thereto, the aircraft interior lining component may be provided, in the region of its second surface, with channels for removing condensation water from the second surface of the aircraft interior lining component. The channels for removing condensation water may be defined, for example, by ribs which are formed in the region of the second surface of the aircraft interior lining component and which, when the aircraft interior lining component is mounted in an aircraft, extend for example parallel to frames of the aircraft primary structure and thus enable a gravity-driven removal of condensation water from the second surface of the aircraft interior lining component. The condensation water removed from the second surface of the aircraft interior lining component via the channels may be collected, for example, in the region of a floor or in an underfloor region of the aircraft cabin and removed from the aircraft. By the targeted removal of condensation water from the second surface of the aircraft interior lining component, it is possible to effectively prevent the primary insulation elements of the aircraft arranged between the aircraft primary structure and the aircraft interior lining from becoming saturated with condensation water and thereby increasing the weight of the aircraft.

A holder for fastening a cabin window to the aircraft interior lining component may be formed integrally with the aircraft interior lining component. Additionally or alternatively thereto, a holder for fastening a window ring to the aircraft interior lining component and/or a holder for fastening a structure window to the aircraft interior lining component may be formed integrally with the aircraft interior lining component. It is, however, also conceivable to form the window ring itself integrally with the aircraft interior lining component. The holder may be embodied, for example, in the form of injection-molded parts which are incorporated in the thermoplastic foam. The integration of holders in the thermoplastic foam material of the aircraft interior lining component enables adhesive-bonded connections to be dispensed with and facilitates the connection, of the components to be fastened by means of the holders, to the aircraft interior lining component by dispensing with loose individual parts.

In a preferred embodiment of the aircraft interior lining component, a conduit is formed integrally with the interior lining component. The conduit may be an air-conditioning pipe of an aircraft air-conditioning system which runs, in the region of the second surface of the aircraft interior lining component, substantially parallel to the second surface of the aircraft interior lining component. Alternatively thereto, the conduit may, however, also be a pipe for laying electrical lines or the like. Additionally or alternatively thereto, an air blow-out box of the aircraft air-conditioning system may be formed integrally with the aircraft interior lining component. The air blow-out box may serve, for example, to blow air, supplied via an air-conditioning pipe, into the aircraft cabin in a region above the aircraft interior lining component.

By integrating a conduit and/or an air blow-out box into the aircraft interior lining component, the number of individual components to be installed in an aircraft cabin can be further reduced and thus the mounting of these components in the aircraft cabin simplified. However, if it is desired, for example owing to preset maintenance processes, to form a conduit configured for example in the form of an air-conditioning pipe and/or an air blow-out box of an aircraft air-conditioning system separately from the aircraft interior lining component, the aircraft interior lining component may be provided, in the region of its second surface, with corresponding receptacles for receiving the conduit and/or the air blow-out box. Furthermore, corresponding holders for fastening the conduit and/or the air blow-out box may be integrated in the foam material of the aircraft interior lining component.

Furthermore, a bionic load transmission structure may be formed integrally with the aircraft interior lining component. The bionic load transmission structure may be embodied, for example, in the form of a spider web-like structure and integrated in the thermoplastic foam material of the aircraft interior lining component, in order to serve as load-transmitting interface between the aircraft interior lining component and another component of the aircraft. For example, a bionic load transmission structure may be integrated in the foam material of the aircraft interior lining component in the region of the supporting section, in order, in a load case, to improve the load transmission from the aircraft interior lining component to the corresponding element of the aircraft primary structure. Furthermore, the aircraft interior lining component may be provided with bionic load transmission structures in the region of its fastening points to the primary structure of the aircraft.

In a preferred embodiment, the aircraft interior lining component is composed at least partially of a polyvinylidene fluoride foam. For example, a polyvinylidene fluoride foam sold by the company Solvay under the brand name SOLEF® 80 000 may be used for producing the aircraft interior lining component. This material is distinguished by good chemical resistance, good UV resistance, good thermal stability and good fire resistance. Moreover, the material has, depending on processing, a low relative density and thus a low weight, good thermal insulating properties and a haptically pleasant compliance and flexibility, as well as sufficient mechanical strength.

In a method according to an embodiment of the invention for producing an aircraft interior lining component, a thermoplastic foam material is introduced into a mold. Preferably, the thermoplastic foam material is fed into the mold in the form of small beads. The mold may, for example, be an aluminum mold which defines a negative form of the aircraft interior lining component to be produced. The thermoplastic foam material introduced into the mold is pressed to form an interior lining component which comprises a first surface and a second surface. The pressing of the thermoplastic foam material may be performed under an elevated temperature. The shaping of the aircraft interior lining component is performed such that the second surface of the aircraft interior lining component has at least one supporting section and at least one surface section adjacent to the supporting section and recessed relative to the supporting section. The supporting section is dimensioned and arranged so that it is supported, when the aircraft interior lining component is mounted in an aircraft, on an element of a primary structure of the aircraft at least when a predetermined load acts on the first surface of the aircraft interior lining component.

The aircraft interior lining component may be provided with an inner hollow space in the region of the supporting section. For this purpose, for example a corresponding shaped body may be provided in the mold or be introduced into the mold. Furthermore, the aircraft interior lining component may be provided with a perforation-proof reinforcing layer in the region of its first surface. A window opening and/or a receiving channel for receiving a blind may be formed in the aircraft interior lining component. These elements too are preferably produced already during the shaping process by corresponding design of the mold. Finally, the aircraft interior lining component may be provided, in the region of its second surface, with an acoustic backing and/or with channels for removing condensation water from the second surface of the aircraft interior lining component.

A holder for fastening a cabin window to the aircraft interior lining component, a holder for fastening a window ring to the aircraft interior lining component, a holder for fastening a structure window to the aircraft interior lining component, a window ring, a conduit, an air blow-out box of an aircraft air-conditioning system and/or a bionic load transmission structure may be introduced into the mold and pressed together with the thermoplastic foam material, in order to form these components integrally with the aircraft interior lining component.

Preferably, the thermoplastic foam material for producing the aircraft interior lining component is a polyvinylidene fluoride foam.

An aircraft assembly according to an embodiment of the invention comprises an aircraft interior lining component described above. Furthermore, the aircraft assembly comprises an element of a primary structure of the aircraft, the aircraft interior lining component being arranged in the aircraft assembly relative to the element of the primary structure of the aircraft in such a manner that the supporting section of the aircraft interior lining component is supported on the element of the primary structure of the aircraft at least when a predetermined load acts on the first surface of the aircraft interior lining component. The element of the primary structure of the aircraft may, for example, be a stringer of the aircraft primary structure.

In a preferred embodiment, the aircraft assembly further comprises a primary insulation element which is arranged between the aircraft interior lining component and the element of the primary structure of the aircraft.

The aircraft interior lining component may be fastened to the primary structure of the aircraft by means of a hook-and-loop tape. This is possible in particular when the aircraft interior lining component has a certain flexibility which enables the attachment of the hook-and-loop tape to the primary structure, in particular to a stringer of the primary structure.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
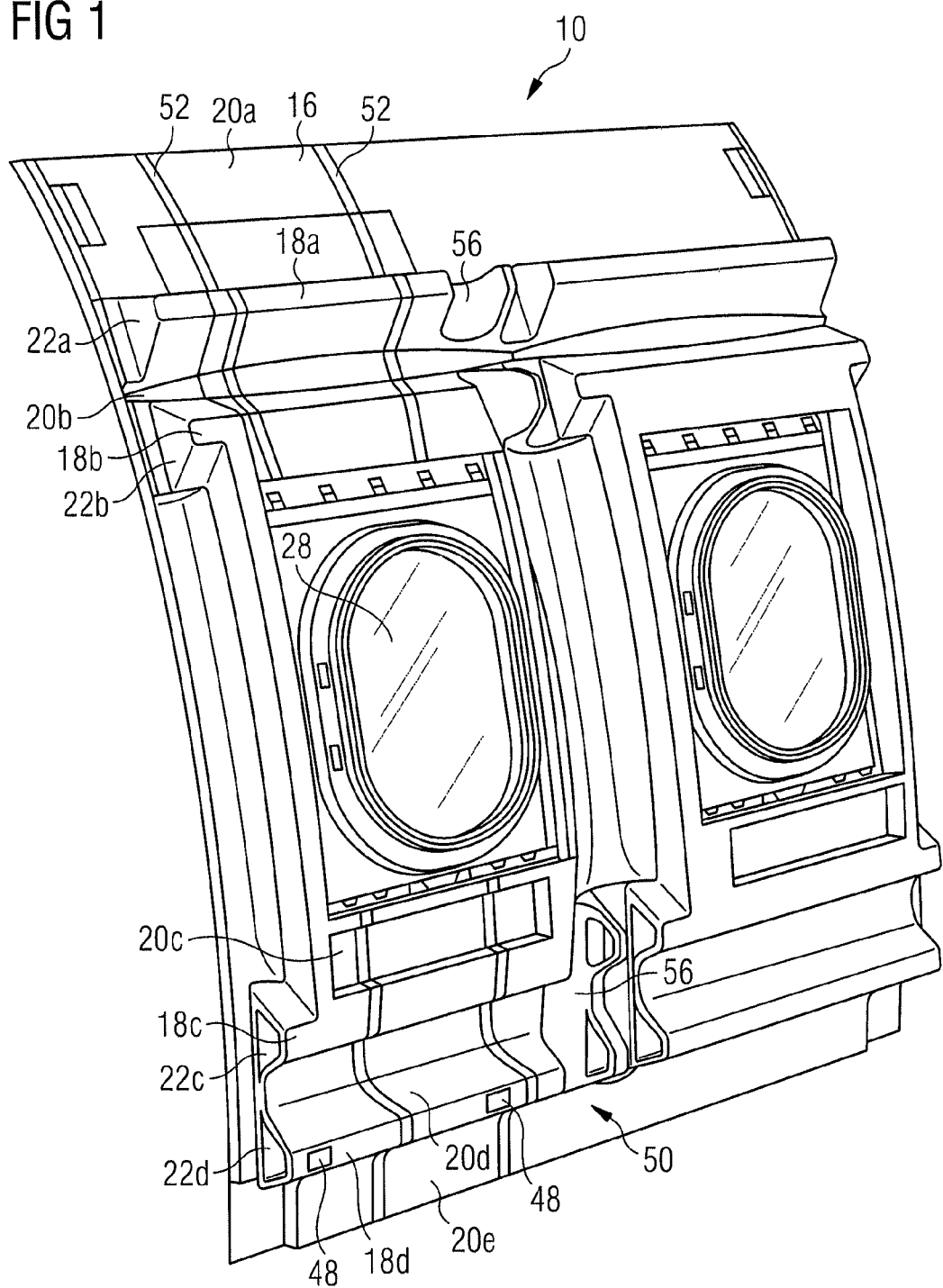
FIG. 1 shows a three-dimensional view of an aircraft interior lining component.

An aircraft interior lining component 10 shown in FIG. 1 comprises a basic structure which is composed of a thermoplastic foam material. In particular, the aircraft interior lining component is made of a polyvinylidene fluoride foam. To produce the aircraft interior lining component 10, the thermoplastic foam material is introduced in the form of small beads into a mold and subsequently pressed under elevated pressure and temperature into the desired shape. The aircraft interior lining component 10 comprises a first surface 12 which faces an interior of an aircraft cabin 14 when the aircraft interior lining component 10 is mounted in an aircraft, see FIG. 3. A second surface 16 of the aircraft interior lining component 10 opposite the first surface 12 faces away from the interior of the aircraft cabin 14 when the aircraft interior lining component 10 is mounted in an aircraft and is illustrated in detail in FIGS. 1 and 2.

The second surface 16 of the aircraft interior lining component 10 is provided with four supporting sections 18a-d. Adjacent to the supporting sections 18a-d there extend surface sections 20a-e which are respectively recessed relative to the supporting sections 18a-d. The aircraft interior lining component 10 thus has, in the region of the surface sections 20a-e, a smaller thickness than in the region of the supporting sections 18a-d. This enables an optimization of the weight of the aircraft interior lining component 10. A further weight optimization of the aircraft interior lining component 10 is achieved by providing the aircraft interior lining component 10 with inner hollow spaces 22a-d in the region of the supporting sections 18a-d, see in particular FIGS. 1 and 3.

Figure 2:
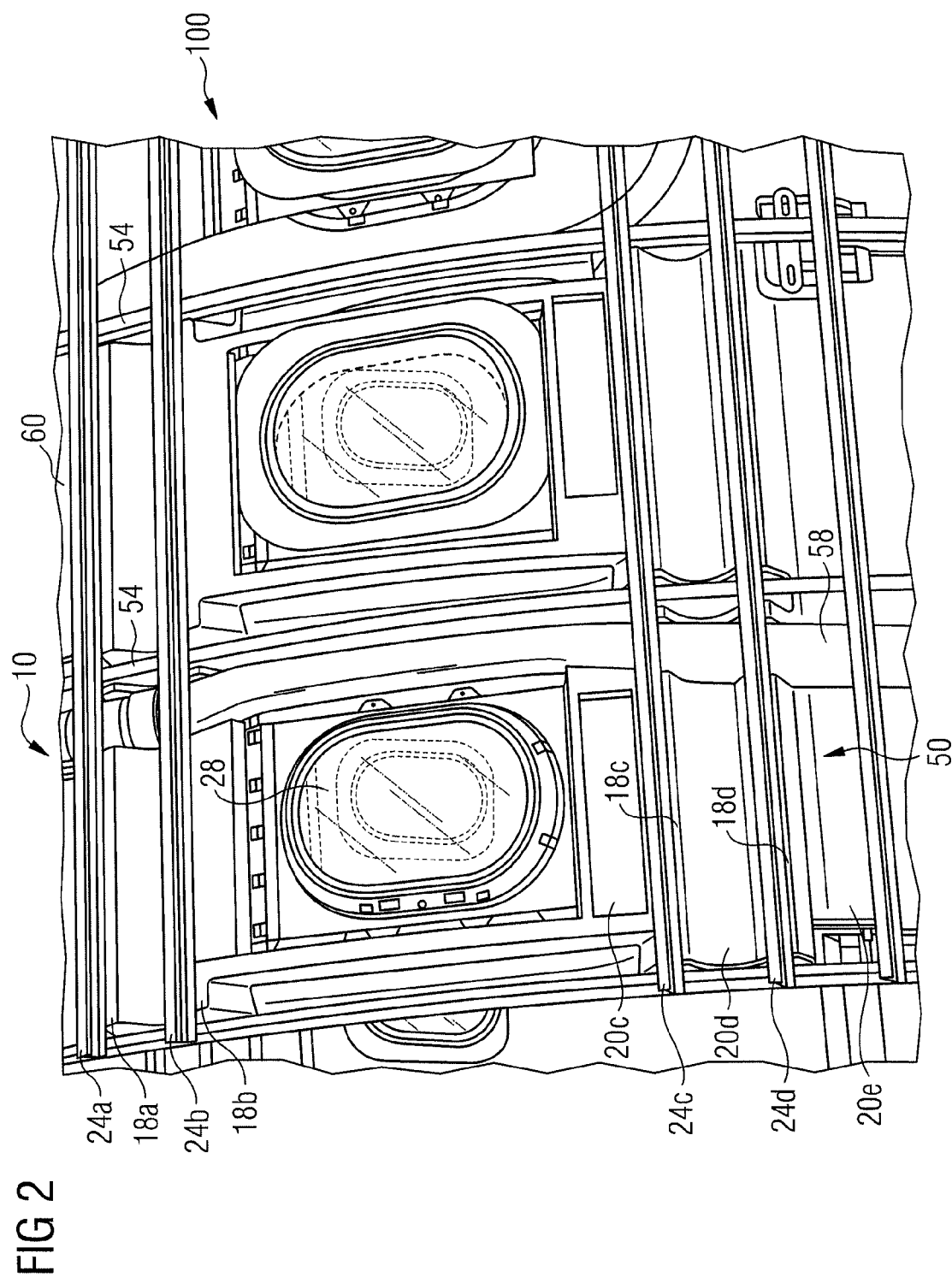
FIG. 2 shows the aircraft interior lining component according to FIG. 1 when mounted in an aircraft.
Figure 3:
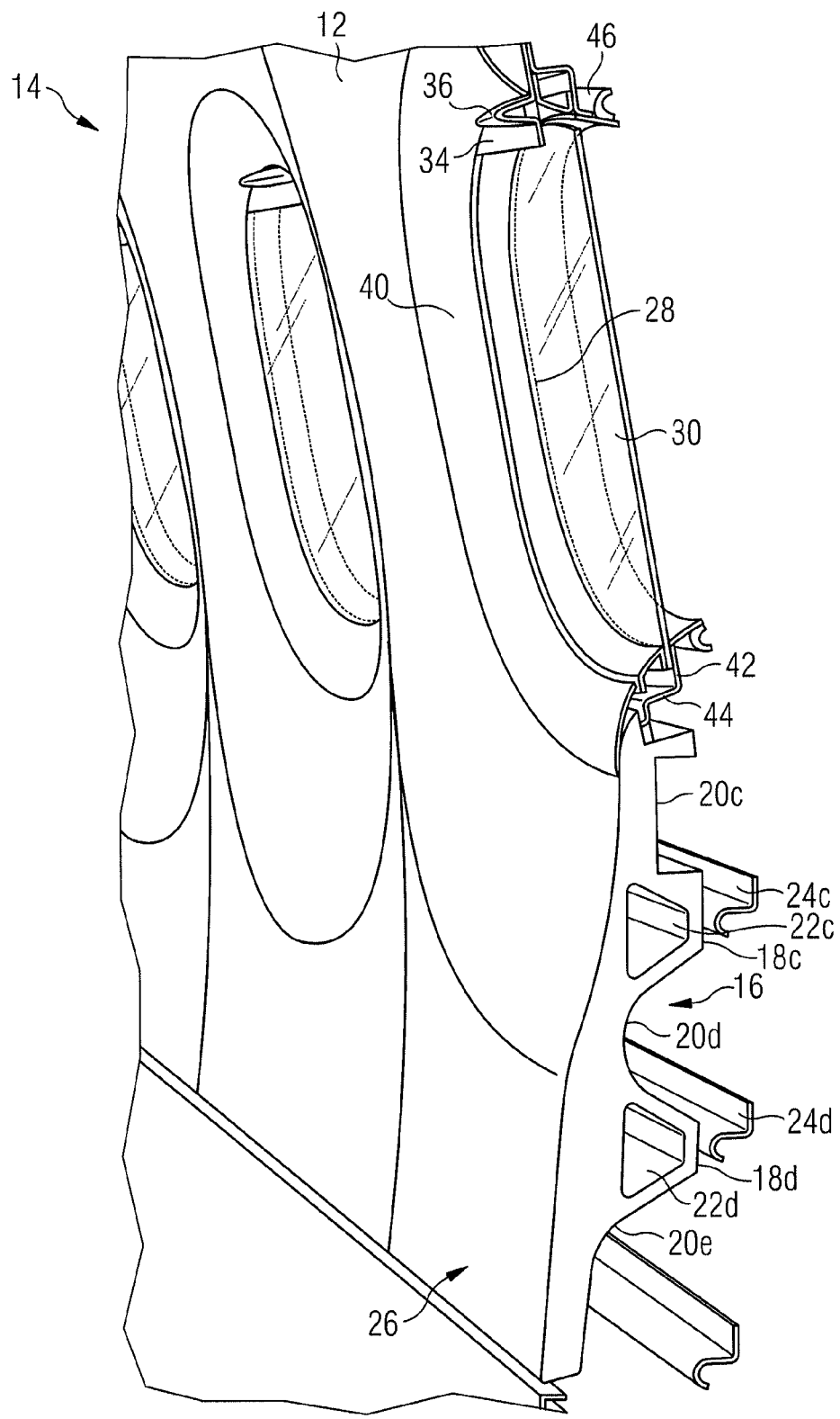
FIG. 3 shows a sectional view of the aircraft interior lining component according to FIG. 1.

As can best be seen in FIGS. 2 and 3, the supporting sections 18a-d are dimensioned and arranged so that they can be supported, when the aircraft interior lining component 10 is mounted in an aircraft, on an element 24a-d of a primary structure of the aircraft configured in the form of a stringer. As a result, it is no longer necessary to dimension the aircraft interior lining component 10 so that all potential loads acting on the aircraft interior lining component 10 can be carried by the aircraft interior lining component 10 itself. Rather, a load acting on the aircraft interior lining component 10 can be transmitted via the supporting sections 18a-d to the elements 24a-d of the aircraft primary structure. This enables the lightweight design of the aircraft interior lining component 10 from the polyvinylidene fluoride foam material. Together with the elements 24a-d of the aircraft primary structure, the aircraft interior lining component 10 forms an aircraft assembly 100, see FIG. 2.

In principle it is conceivable to form the supporting sections 18a-d of the aircraft interior lining component 10 so that, when the aircraft interior lining component 10 is mounted in an aircraft, they bear directly against the elements 24a-d of the aircraft primary structure. Advantageously, the supporting sections 18a d are, however, arranged at a predetermined distance from the elements 24a-d of the aircraft primary structure when no load acts on the first surface 12 of the aircraft interior lining component 10. The distance between the supporting sections 18a-d and the respective elements 24a-d of the aircraft primary structure may, for example, be 5 mm, see FIG. 3. This enables the arrangement of a primary insulation element (not illustrated in the figures) between the aircraft interior lining component 10 and the elements 24a-d of the aircraft primary structure. The distance provided between the supporting sections 18a-d and the elements 24a-d of the aircraft primary structure should, however, be dimensioned so that the supporting sections 18a-d come to bear against the elements 24a-d of the aircraft primary structure and thus ensure a load-transmitting support of the aircraft interior lining component 10 when a predetermined load acts on the first surface 12 of the aircraft interior lining component 10. A predetermined load may be defined, for example, as a hand load which acts on the first surface 12 of the aircraft interior lining component 10 when a person leans against the first surface 12 of the aircraft interior lining component 10.

In the region of its first surface 12, the aircraft interior lining component 10 is provided with a perforation-proof reinforcing layer 26, see FIG. 3. The reinforcing layer 26 is composed of a carbon-fibre-reinforced recycled plastics material and forms at the same time a decorative layer which ensures an attractive appearance of the aircraft interior lining component 10.

Figure 4:
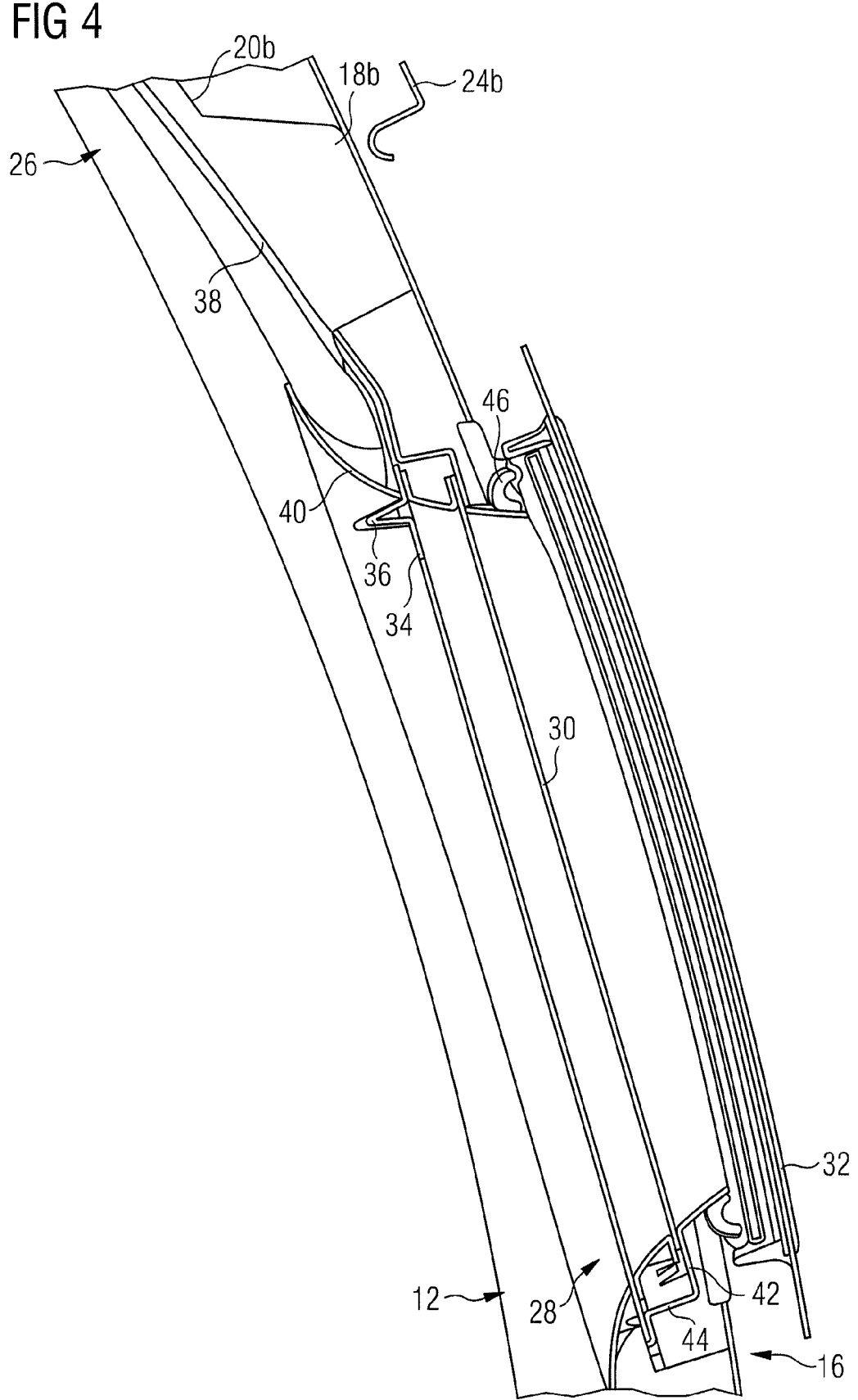
FIG. 4 shows a sectional view of a window region of the aircraft interior lining component according to FIG. 1.

In the embodiment shown in the figures, the aircraft interior lining component 10 is configured in the form of a side lining panel and provided with a window opening 28. The window opening 28 is closed in the conventional manner with a cabin window 30 facing the interior of the aircraft cabin and a structure window 32 facing the primary structure of the aircraft, see FIG. 4. Furthermore, there is provided a blind 34 which has a handle 36 at which the blind 34 can be grasped and moved between a closed position and an open position. When the blind 34 is in its open position, in which it uncovers the window opening 28, the blind 34 is received in a receiving channel 38 which is formed in the aircraft interior lining component 10.

A window ring 40 surrounding the window opening 28 is formed, in the embodiment of an aircraft interior lining component 10 shown in the figures, separately from the aircraft interior lining component 10. It is, however, also conceivable to form the window ring 40 integrally with the aircraft interior lining component 10. Likewise, a holder 42 for fastening the cabin window 30 to the aircraft interior lining component 10, a holder 44 for fastening the window ring 40 to the aircraft interior lining component 10 and a holder 46 for fastening the structure window 32 to the aircraft interior lining component 10 may not, as shown in the figures, be formed as separate components, but integrally with the aircraft interior lining component 10. For this purpose, the holders 42, 44, 46, which may, for example, be embodied in the form of injection-molded components, may be pressed together with the thermoplastic foam material of the aircraft interior lining component 10 in a suitable mold.

In a similar manner, a bionic load transmission structure 48 configured, for example, in the form of a spider web, indicated merely schematically in FIG. 1, may be formed integrally with the aircraft interior lining component 10 by introducing the bionic load transmission structure 48, together with the thermoplastic foam material defining the aircraft interior lining component 10, into a mold and subsequently pressing it with the thermoplastic foam material.

The thermoplastic foam material of the aircraft interior lining component 10 already has good sound-deadening properties. In order to further improve the acoustic properties of the aircraft interior lining component 10, the aircraft interior lining component 10 is, however, additionally provided with an acoustic backing 50 in the region of its second surface 16. The acoustic backing 50 is embodied in the form of a sound-absorbing nonwoven fabric.

Furthermore, the aircraft interior lining component 10 is provided, in the region of its second surface 16, with channels 52, likewise merely schematically indicated in FIG. 1, for removing condensation water from the second surface 16 of the aircraft interior lining component 10. The channels 52 extend, when the aircraft interior lining component 10 is mounted in an aircraft, parallel to frames 54 of the aircraft primary structure (see FIG. 2), thereby enabling a gravity-driven removal of condensation water, collecting in the region of the second surface 16 of the aircraft interior lining component 10, in the direction of a floor or of an underfloor region of the aircraft cabin 15. By providing channels 52 for removing condensation water in the region of the second surface 16 of the aircraft interior lining component 10, it is possible to effectively prevent the primary insulation elements arranged between the aircraft interior lining component 10 and the aircraft primary structure from becoming saturated with condensation water, and thereby increasing the weight of the aircraft in an undesirable manner.

Finally, as is clear from FIGS. 1 and 2, the aircraft interior lining component 10 is provided, in the region of its second surface 16, with receptacles 56 for receiving a conduit 58. The conduit 58 is an air-conditioning pipe of an aircraft air-conditioning system, the first end of which is connected to an air-conditioning unit of the aircraft air-conditioning system and the second end of which opens into an air blow-out box 60. Via the air blow-out box 60, air-conditioning air generated by the air-conditioning unit of the air-conditioning system can be blown into the aircraft cabin 14 in a region above the aircraft interior lining component 10. In the arrangement shown in the figures, the conduit 58 and the air blow-out box 60 are embodied separately from the aircraft interior lining component 10. It is, however, also conceivable to form these two components, or at least holders for fastening these two components to the aircraft interior lining component 10, integrally with the aircraft interior lining component 10.

The aircraft interior lining component 10 may be connected to the primary structure of the aircraft via existing fastening points provided on the primary structure of the aircraft. Alternatively to this, it is, however, also conceivable to fasten the aircraft interior lining component 10 to the primary structure of the aircraft with the aid of hook-and-loop tapes, for example to the primary structure elements 24a-d configured in the form of stringers. For this purpose, the interior lining component 10 should, however, have a certain flexibility.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An aircraft interior lining component comprising:
a pressure molded thermoplastic foam material that is formed and shaped to comprise:
a first surface facing an interior of an aircraft cabin when the aircraft interior lining component is mounted in an aircraft; and
a second surface facing away from the interior of the aircraft cabin when the aircraft interior lining component is mounted in the aircraft, the second surface comprising a supporting section and at least one surface section adjacent to the supporting section and recessed relative to the supporting section, the supporting section being dimensioned and arranged to be parallel to a longitudinal axis of the aircraft and to be supported, when the aircraft interior lining component is mounted in the aircraft, on a stringer element of a primary structure of the aircraft when a predetermined load acts on the first surface of the aircraft interior lining component, the stringer element extending parallel to the longitudinal axis of the aircraft.

2. The aircraft interior lining component according to claim 1, wherein the aircraft interior lining component is provided with an inner hollow space in the region of the supporting section.

3. The aircraft interior lining component according to claim 1, wherein the aircraft interior lining component is provided with a perforation-proof reinforcing layer in the region of the first surface.

4. The aircraft interior lining component according to claim 1, wherein at least one of a window opening and a receiving channel for receiving a blind is formed in the pressure molded thermoplastic foam material of the aircraft interior lining component.

5. The aircraft interior lining component according to claim 1, wherein the pressure molded thermoplastic foam material of the aircraft interior lining component is provided, in the region of the second surface, with at least one of an acoustic backing and channels for removing condensation water from the second surface of the aircraft interior lining component.

6. The aircraft interior lining component according to claim 1, wherein at least one of a holder for fastening a cabin window to the aircraft interior lining component, a holder for fastening a window ring to the aircraft interior lining component, a holder for fastening a structure window to the aircraft interior lining component, a conduit and an air blow-out box of an aircraft air-conditioning system is formed integrally with the pressure molded thermoplastic foam material of the aircraft interior lining component.

7. The aircraft interior lining component according to claim 1, wherein a bionic load transmission structure is formed integrally with the pressure molded thermoplastic foam material of the aircraft interior lining component.

8. The aircraft interior lining component according to claim 1, wherein the pressure molded thermoplastic foam material of the aircraft interior lining component is composed at least partially of a polyvinylidene fluoride foam.

9. An aircraft assembly comprising:
an aircraft interior lining component comprising a pressure molded thermoplastic foam material that is formed and shaped to comprise:
- a first surface facing an interior of an aircraft cabin when the aircraft interior lining component is mounted in an aircraft; and
- a second surface facing away from the interior of the aircraft cabin when the aircraft interior lining component is mounted in the aircraft, the second surface comprising a supporting section and at least one surface section adjacent to the supporting section and recessed relative to the supporting section, the supporting section being dimensioned and arranged to be parallel to a longitudinal axis of the aircraft and to be supported, when the aircraft interior lining component is mounted in the aircraft, on an element of a primary structure of the aircraft when a predetermined load acts on the first surface of the aircraft interior lining component; and
- a stringer element of a primary structure of the aircraft, the stringer element extending parallel to the longitudinal axis of the aircraft, the aircraft interior lining component being arranged relative to the stringer element of the primary structure of the aircraft in such a manner that the supporting section of the aircraft interior lining component is supported on the stringer element of the primary structure of the aircraft when the predetermined load acts on the first surface of the aircraft interior lining component.

10. The aircraft assembly according to claim 9, further comprising a primary insulation element arranged between the aircraft interior lining component and the stringer element of the primary structure of the aircraft.

11. The aircraft assembly according to claim 9, wherein the aircraft interior lining component is fastened to the primary structure of the aircraft by a hook-and-loop tape.

* * * * *